Sept. 23, 1924.

W. P. LANGLEY 1,509,734

DRINKING CUP

Filed Oct. 24, 1923

WITNESSES
Edw. Thorpe

INVENTOR
William P. Langley
BY
ATTORNEYS

Patented Sept. 23, 1924.

1,509,734

UNITED STATES PATENT OFFICE.

WILLIAM PERCY LANGLEY, OF PITTSFIELD, MASSACHUSETTS.

DRINKING CUP.

Application filed October 24, 1923. Serial No. 670,598.

*To all whom it may concern:*

Be it known that I, WILLIAM P. LANGLEY, a citizen of the United States of America, and a resident of Pittsfield, in the county of Berkshire and State of Massachusetts, have invented a new and Improved Drinking Cup, of which the following is a description.

My invention relates to a drinking cup and more especially is intended to provide a child's milk cup.

The general object of my invention is to provide a cup from which a child may drink water, milk, or other food, and of such a character that the child cannot contaminate the contents of the cup in playing.

A further object is to provide a cup that while preserving the contents from contamination, is nevertheless adapted to be disassembled to permit a thorough cleaning of the cup.

The manner and means by which the above and other objects are attained will clearly appear as the description proceeds.

Reference is to be had to the accompanying drawings forming a part of this specification, it being understood that the drawings are merely illustrative of one example of the invention.

Figure 1:
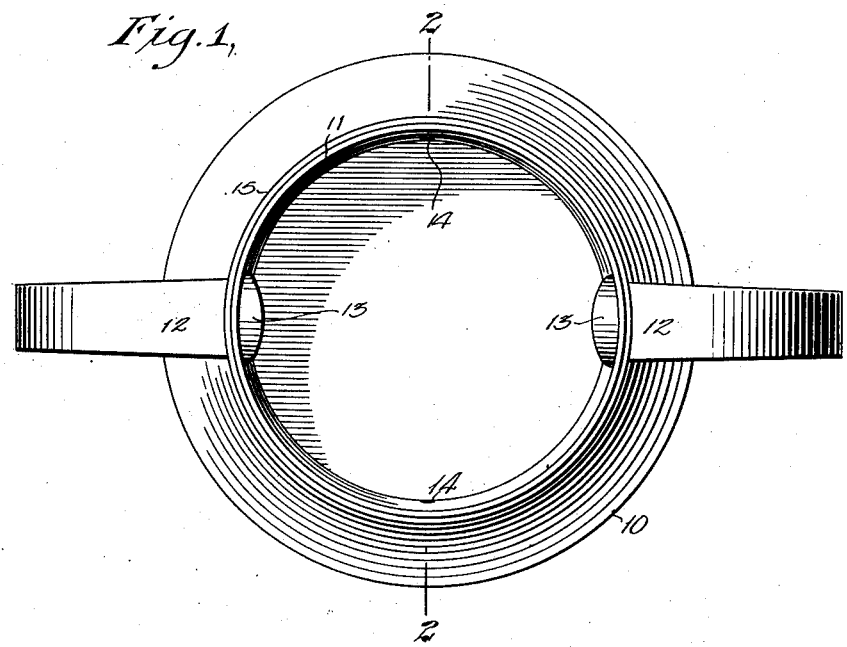
Figure 1 is a plan view of a drinking cup formed in accordance with my invention.
Figure 2:
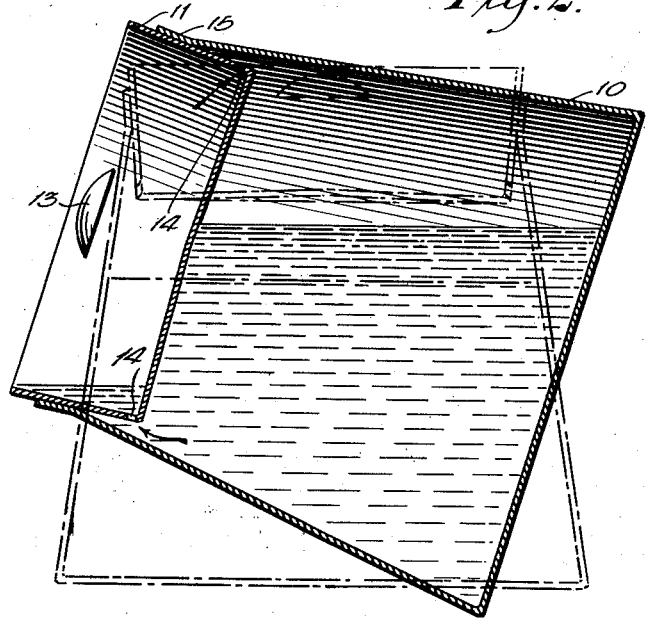
Figure 2 is a vertical section of the cup in tilted position, the dotted lines indicating the upright position of the cup.

In carrying out my invention in accordance with the illustrated example, an outer vessel or cup body 10 is provided, flaring toward the bottom, together with a preferably cylindrical shallow inner cup 11 which fits fluid-tight within the outer vessel 10 at the top edge, so as to prevent leakage of the milk or other contents of the cup when tilted or inverted. On the outer cup 10 is any suitable handle or handles 10 here shown as two diametrically opposite handles. On the inner shallow cup 11 at the interior are diametrically opposite lifting members 13 preferably concavo-convex.

The inner cup 11 has diametrically opposite holes 13 adjacent to the bottom, so that when the cup is inclined, the one hole serves for the outflow of the fluid from the outer cup 10 when said hole is disposed at the bottom of the drinking cup while the second hole diametrically opposite will thus be disposed at the top and serve as a vent. The outer cup 10 has preferably a cylindrical neck 13 to effect a liquid-tight fitting of the inner cup within the same.

With the above described construction if the cup be up-ended and placed bottom up on a table or the like, the liquid does not flow outwardly through holes 14 but there is a free flow when the cup is tilted and so disposed that the one hole 14 will be at the bottom and one at the top.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. As a new article of manufacture, a drinking cup comprising an outer vessel, and a shallow inner cup fitting fluid-tight in said vessel at the top directly adjacent to the walls of the outer vessel and adapted to hold a limited quantity of the fluid received from the outer vessel, said inner cup having means to permit outflow of the fluid from the outer vessel to the inner cup and having a vent.

2. As a new article of manufacture, a drinking cup comprising an outer vessel, and a shallow inner cup fitting fluid-tight in said vessel at the top directly adjacent to the walls of the outer vessel, said inner cup having means to permit outflow of the fluid from the outer vessel to the inner cup and having a vent; together with lift members on the inner cup at the interior to facilitate the removal of said inner cup.

3. As a new article of manufacture, a drinking cup comprising an outer vessel flaring downwardly and formed with a cylindrical neck, and a shallow cup having a fluid-tight fit in said neck directly at the walls thereof, said inner cup having diametrically opposite holes in the sides adjacent the bottom thereof.

WILLIAM PERCY LANGLEY.